United States Patent
Beigbeder et al.

(10) Patent No.: US 8,080,285 B2
(45) Date of Patent: Dec. 20, 2011

(54) MARINE ANTI-BIOFOULING RELEASE COATING OF POLYSILOXANE AND CYLINDRICAL NANOFILLER

(75) Inventors: Alexandre Beigbeder, Valenciennes (FR); Daniel Bonduel, Mons (BE); Michaël Claes, Romsee (BE); Philippe Degee, Battice (BE); Philippe DuBois, Braives (BE)

(73) Assignee: Nanocyl S.A., Sambreville (BE)

( * ) Notice: Subject to any disclaimer, the term of this patent is extended or adjusted under 35 U.S.C. 154(b) by 0 days.

(21) Appl. No.: 12/444,511

(22) PCT Filed: Oct. 18, 2007

(86) PCT No.: PCT/BE2007/000114
§ 371 (c)(1),
(2), (4) Date: Oct. 29, 2009

(87) PCT Pub. No.: WO2008/046166
PCT Pub. Date: Apr. 24, 2008

(65) Prior Publication Data
US 2010/0130665 A1      May 27, 2010

Related U.S. Application Data

(60) Provisional application No. 60/852,771, filed on Oct. 18, 2006.

(30) Foreign Application Priority Data

Jul. 11, 2007 (EP) .................................. 07447043

(51) Int. Cl.
*B05D 3/02* (2006.01)
*C08L 83/06* (2006.01)
(52) U.S. Cl. .................... 427/386; 524/588; 977/783
(58) Field of Classification Search .................... None
See application file for complete search history.

(56) References Cited

U.S. PATENT DOCUMENTS

| 4,861,670 | A | * | 8/1989 | Lampe et al. ................. 428/447 |
| 5,298,060 | A | * | 3/1994 | Harakal et al. ............. 106/15.05 |
| 5,331,074 | A | * | 7/1994 | Slater et al. ..................... 528/14 |
| 2008/0318044 | A1 | * | 12/2008 | Tian et al. ..................... 428/401 |
| 2009/0286917 | A1 | * | 11/2009 | Mahajan ....................... 524/445 |

FOREIGN PATENT DOCUMENTS

| JP | 02107691 A | | 4/1990 |
| JP | 2000-26760 A | * | 1/2000 |
| JP | 2000026760 A | | 1/2000 |
| JP | 2003055581 A | | 2/2003 |
| KR | 1020040088902 A | | 10/2004 |
| WO | WO 87/03261 A1 | | 6/1987 |
| WO | WO 2004/072202 A2 | | 8/2004 |

* cited by examiner

*Primary Examiner* — Robert Sellers
(74) *Attorney, Agent, or Firm* — Reinhart Boerner Van Deuren s.c.

(57) ABSTRACT

The present invention relates to the use of a composition comprising a polysiloxane-based polymer and at least one cylindrical nanofiller as a marine anti-biofouling and/or fouling release coating.

16 Claims, 9 Drawing Sheets

MARINE ANTI-BIOFOULING RELEASE COATING OF POLYSILOXANE AND CYLINDRICAL NANOFILLER

CROSS-REFERENCE TO RELATED PATENT APPLICATIONS

This patent application is the National Stage of International Application No. PCT/BE2007/000114, filed Oct. 18, 2007, that claims the benefit of U.S. Provisional Patent Application No. 60/852,771, filed Oct. 18, 2006, and European Application No. 07447043.6, filed Jul. 11, 2007, the entire teachings and disclosure of which are incorporated herein by reference thereto.

SUBJECT OF THE INVENTION

The present invention relates to the use of a composition for reducing the biological fouling of surfaces in permanent or prolonged contact with the marine environment.

PRIOR ART

Biological contamination by the marine environment, which is known as biofouling, whether it is micro-organic or macro-organic, is a major problem, not only for land-based installations that use a large amount of seawater, but also for offshore installations and more generally for any object in permanent or prolonged contact with seawater, for instance boat hulls and aquaculture ropes, cages and nets. The reason for this is that marine organisms, such as algae, shellfish and other crustaceans, attach themselves to and then grow on the exposed surfaces, which has the consequence of impairing the correct functioning and of deteriorating the installations or objects to which they are attached. In particular, they may, for example, block the inlets of seawater intake valves and thus reduce the water uptake capacity of land-based installations using seawater, or they may become attached to ship hulls, reducing their speed and increasing their fuel consumption.

Marine anti-biofouling and fouling release compositions are usually applied to the surfaces in permanent contact with the marine environment to control or prevent the attachment or growth of such marine organisms, or alternatively to facilitate their removal. Such a composition generally contains one or more compounds that are toxic to the marine organisms that attach to the submerged surfaces that it is desired to protect. In order to be durably effective, these toxic compounds have the drawback of needing to be released into the marine environment by the marine anti-biofouling coating or paint over a more or less long period. As a result, such a composition is always polluting, all the more so since it generally comprises compounds such as mercury, lead or arsenic.

Certain marine anti-biofouling coatings or paints comprise copper-based compounds, which have been known for a long time for their toxicity to phytoplankton and other marine organisms. The copper may be, for example, in the form of cuprous oxide, copper dioxide, copper thiocyanate, copper acrylate, flaked copper powder or copper hydroxide, and may be released into the marine environment in the form of copper ions. Unfortunately, this solution has the drawback of not being long-lasting. Specifically, once the copper content of the coating has been depleted, the coating is no longer effective. Usually, the compositions are very highly dosed with copper in order to give the coating a longer service life. However, the use of high concentrations of copper may also give rise to pollution of the marine environment.

Environmental regulations are heading towards banning within a few years the use of marine anti-biofouling coatings such as those mentioned previously, but also those comprising tin (IV) derivatives such as tin oxides or tributyltin, which are all environmentally toxic and hazardous, in favour of alternative coatings that are more environmentally friendly.

The document WO 87/03261 especially proposes an alternative solution that consists in producing, across the surface to be protected, an AC or DC current whose intensity and frequency are sufficient to give the marine organisms electric shocks and prevent their attachment. However, this solution has the drawback of being relatively impractical to implement.

AIMS OF THE INVENTION

The present invention is directed towards providing a marine anti-biofouling and/or fouling release composition that does not have the drawbacks of the prior art.

It is directed in particular towards providing a composition that is more environmentally friendly and easy to use.

It is also directed towards providing a composition that gives the supports, onto which it is applied, a resistance to soiling of marine origin.

It is moreover directed towards providing a composition capable to reduce the frequency of cleaning of the supports onto which it is applied, and to reduce the intervention time.

SUMMARY OF THE INVENTION

The present invention describes the use of a composition comprising a polysiloxane-based polymer and at least one cylindrical nanofiller as a marine anti-biofouling and/or fouling release coating.

According to particular embodiments, the marine anti-biofouling and/or fouling release composition may comprise one or a combination of any of the following characteristics:

- the cylindrical nanofiller represents in weight between 0.01% and 10% of the total weight of said composition;
- the cylindrical nanofiller represents in weight between 0.01% and 3.5% of the total weight of said composition;
- the cylindrical nanofiller comprises carbon nanotubes;
- the carbon nanotubes represent in weight between 0.01% and 2.5% of the total weight of the composition;
- the carbon nanotubes represent in weight between 0.01% and 1% of the total weight of the composition;
- the carbon nanotubes represent in weight between 0.05% and 1% of the total weight of the composition;
- the carbon nanotubes represent in weight between 0.05% and 0.5% of the total weight of said composition;
- the carbon nanotubes represent in weight 0.1% of the total weight of said composition;
- the carbon nanotubes are chosen from the group of single-walled carbon nanotubes (SWNTs), double-walled carbon nanotubes (DWNTs) and multi-walled carbon nanotubes (MWNTs);
- the cylindrical nanofiller comprises sepiolite;
- the sepiolite represents in weight between 0.1% and 10% of the total weight of said composition;
- the sepiolite represents in weight between 0.1% and 3.5% of the total weight of said composition;
- the sepiolite represents in weight between 0.1% and 1% of the total weight of said composition;
- the composition comprises sepiolite and carbon nanotubes;

in a composition comprising sepiolite and carbon nanotubes, the carbon nanotubes represent in weight between 0.05% and 0.1% of the total weight of the composition and sepiolite represents in weight between 1% and 3.5% of the total weight of the composition.

DETAILED DESCRIPTION OF THE INVENTION

Figure 1:
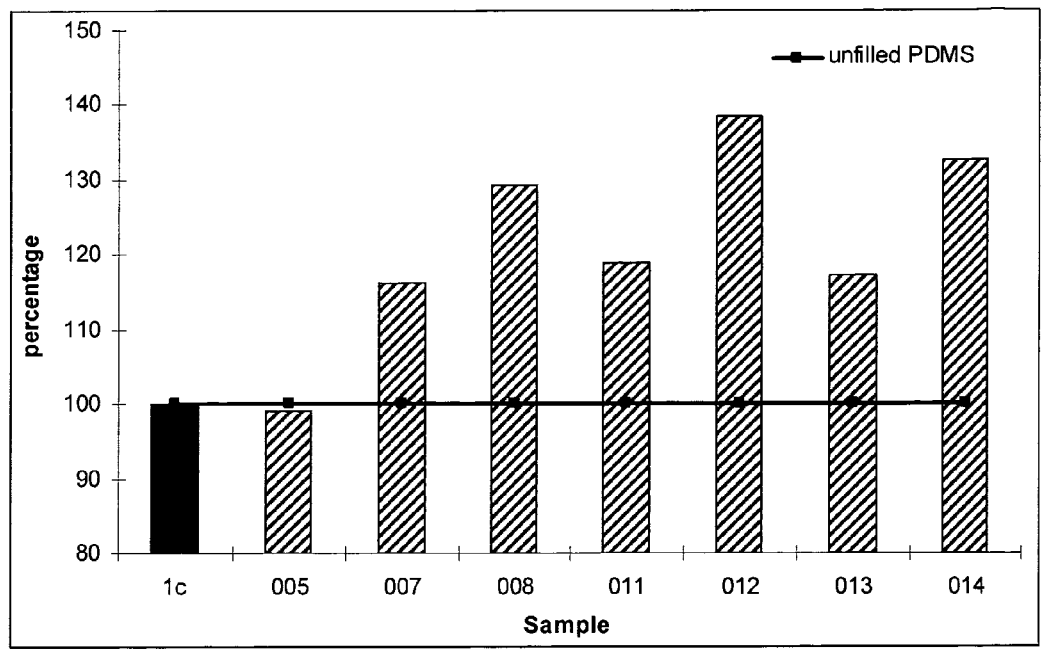
FIG. 1 represents the improvement of the crustaceans release of PDMS-based coatings comprising carbon nanotubes.

In order to address the problem of obtaining a marine anti-biofouling and/or fouling release composition, which is easy to use and non-toxic to marine life, and which has the advantage of facilitating the detachment or dislodging of organisms and algae that may have become bound to the support or surface coated with the said composition, the invention proposes the use of a composition comprising a cylindrical nanofiller in a polysiloxane-based polymer. By creating a surface that is highly non-stick for marine organisms, these organisms are incapable of durably gripping to the surface covered with the coating according to the invention, and can be removed more easily.

The term "support" means any material that can be coated with a polymer, and the term "surface" means any surface, whether interior or exterior, vertical or horizontal, of any body or object. Without being limiting, the supports concerned may be flexible supports or non-flexible supports. They may be, for example, metal, plastic, glass or ceramic components, or alternatively polymeric or elastomeric supports.

The term "cylindrical nanofiller" means a filler having the form of a cylinder, a needle or a fibre, and of which two of the three dimensions of the filler are less than 100 nm, or even of the order of from one to a few tens of nanometers.

The composition according to the invention has non-stick properties with respect to marine organisms and/or marine algae, and has the advantage of being able to obtain a strong and flexible coating, which does not crack or become fissured. The composition may be applied with good adhesion to the entire surface, whether the surface is made, for example, of wood, metal, glass or plastic.

According to one preferred embodiment of the invention, the polysiloxane-based polymer used is Sylgard 184 from Dow Corning, which is a resin that crosslinks by hydrosilylation.

The term "resin that crosslinks by hydrosilylation" means a resin obtained from two precursors of polysiloxane type, one comprising vinyl groups and the other hydrosilane groups.

The crosslinking consists of an addition reaction of the hydrosilane groups to the vinyl groups (Scheme 1).

Scheme 1

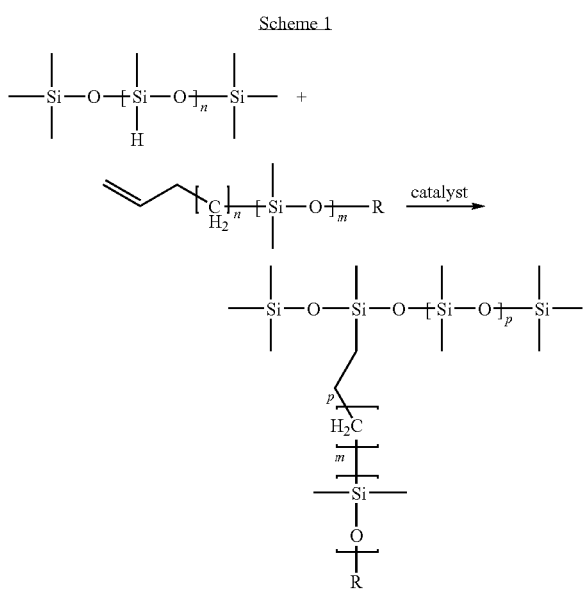

The composition of the resin Sylgard 184 from Dow Corning is given in Table 1 and the chemical structure of the components is given in Schemes 2 to 5.

TABLE 1

Composition of the resin

| | Precursor A | Precursor B |
|---|---|---|
| Constituent 1 Nature and percentage | PDMS vinyl-terminated SFD 117 67% | Si—H polymer (0.76% H, MDD(H)) 60% |
| Constituent 2 Nature and percentage | VQM 1 (2% vinyl) 31% | SFD 117 39% |
| Constituent 3 Nature and percentage | Platinum catalyst 0.14% | Inhibitor methylcyclotetra-siloxane 1% |
| Other constituents | Cyclic compounds and volatile low-molecular-weight silicone (1.5%) and xylene (0.7%) | |
| Dynamic viscosity | 4817 cP | 89.1 cP |

Scheme 2: SFD 117, polysiloxane bearing vinyl groups

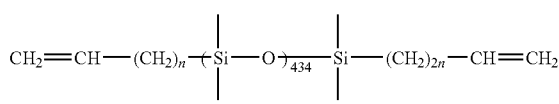

Scheme 3: Polymer of polysiloxane type bearing hydrosilane groups

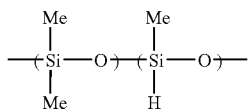

Scheme 4: Crosslinking inhibitor

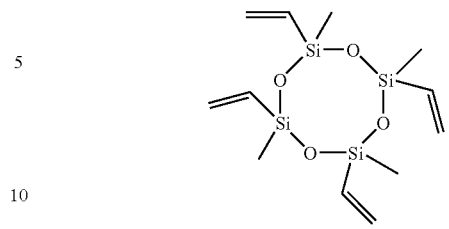

Scheme 5: VQM matrix comprising a polydimethylsiloxane micro-network

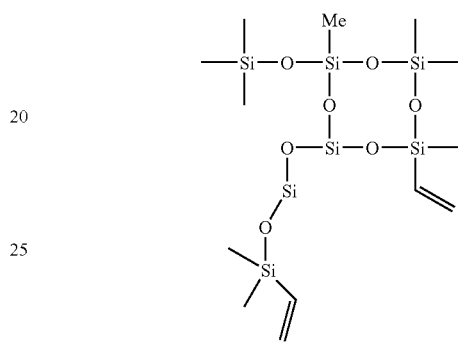

The cylindrical nanofiller is any suitable filler having the form of a cylinder, a needle or a fibre, and of which two of the three dimensions of the filler are less than 100 nm, or even of the order of from one to a few tens of nanometers. Preferably, the filler is sepiolite or carbon nanotubes, or a combination of sepiolite and carbon nanotubes.

Sepiolite is a clay of fibrous structure, of formula $Mg_4Si_6O_{15}(OH)_2 \cdot 6H_2O$. It generally consists of fibres from about 0.1 to 5 μm in length and from 5 to 40 nm in diameter.

Carbon nanotubes are a particular crystalline structure of carbon atoms, of tubular, hollow and close-packed form, from about 0.1 to 50 μm in length and from about 2 to 50 nm in diameter. They may be single-walled carbon nanotubes (SWNTs), double-walled carbon nanotubes (DWNTs) or multi-walled carbon nanotubes (MWNTs). They are preferably multi-walled carbon nanotubes (MWNTs). Preferably, they are multi-walled carbon nanotubes from 1.3 to 1.7 μm in length and 7 to 12 nm in diameter, which have undergone no post-synthetic treatment, in particular no purification.

Conventionally, polysiloxane-based compositions are obtained from precursors A and B that are mixed together with stirring, for example for 30 minutes, with a ratio of 10 to 1 (10 parts of precursor A per one part of precursor B). The fillers, for the compositions that comprise them, are added to the precursor A with stirring, for example at 1000 rpm for 30 minutes, before adding the precursor B.

Preferably, carbon nanotubes are premixed in the precursor A. The carbon nanotubes in the premix represent 0.5 to 2.5% of total weight of the composition. The premix is then mixed and/or diluted in precursor A using an helix blade to get the desired composition. The mixture thus obtained is applied to microscope slides, which are maintained at 105° C. for 4 hours. The coating thicknesses thus obtained are of the order of from 0.2 to 4 mm.

Various compositions (table 2) were prepared and their marine anti-biofouling and/or fouling release properties were studied, first by measuring the force required to remove crustaceans (barnacles) attached to a surface covered with the compositions according to the invention, and by measuring the cellular colonization by spores of the marine alga *Ulva*.

TABLE 2

Samples tested in the settlement and barnacles release tests and in the growth and strength of attachment of Ulva sporeling

| Samples | Description |
|---|---|
| 1c | Unfilled silicone (PDMS - Sylgard 184) |
| 005 | Filled Sylgard 184 (0.01% CNTs) |
| 007 | Filled Sylgard 184 (0.05% CNTs) |
| 008 | Filled Sylgard 184 (0.1% CNTs) - obtained with the use of a premix |
| 009 | Filled Sylgard 184 (0.1% CNTs) - obtained without the use of a premix |
| 010 | Filled Sylgard 184 (0.1% CNTs) - obtained without the use of a premix |
| 011 | Filled Sylgard 184 (0.3% CNTs) |
| 012 | Filled Sylgard 184 (0.5% CNTs) |
| 013 | Filled Sylgard 184 (1% CNTs) |
| 014 | Filled Sylgard 184 (2.5% CNTs) |
| 015 | Filled Sylgard 184 (0.1% Sepiolite) |
| 016 | Filled Sylgard 184 (0.5% Sepiolite) |
| 017 | Filled Sylgard 184 (1% Sepiolite) |
| 018 | Filled Sylgard 184 (3.5% Sepiolite) |
| 019 | Filled Sylgard 184 (7% Sepiolite) |
| 020 | Filled Sylgard 184 (10% Sepiolite) |
| 021 | Filled Sylgard 184 (0.05% CNTs & 1% Sepiolite) |
| 022 | Filled Sylgard 184 (0.05% CNTs & 3.5% Sepiolite) |
| 023 | Filled Sylgard 184 (0.1% CNTs & 1% Sepiolite) |
| 024 | Filled Sylgard 184 (0.1% CNTs & 3.5% Sepiolite) |

Regarding the study of the adhesion of crustaceans, the samples were pre-immersed for seven days in a reservoir containing water purified by reverse osmosis or in artificial seawater for one hour before the assay was started. The settlement assay protocol is the one described on pages 19 and 20 of the Biological Workshop Manual (BWM, AMBIO Biological evaluation workshop, University of Birmingham, UK, 21-22 Apr. 2005) with slight modification. About twenty three-day-old barnacle larvae (cyprids) are placed on the coating samples in 1 mL of artificial seawater, before being incubated for 24 or 48 hours at 28° C. After 24 hours, each coating samples was inspected to obtain the percentage settlement. After a further period of 24 hours, the slides were again inspected and settlement data were obtained for a period of 48 hours in total.

The force required to detach the barnacles from the PDMS-based coatings is then measured using a device intended for this purpose and the settlement on the different PDMS-based coatings is normalised to the standard sample 1c (i.e. PDMS-based coating without any filler).

The evaluation of the adhesion of crustaceans to a surface coated with the compositions according to the invention mainly takes into account two parameters: one concerns the force, per unit area, to be applied in order to detach the crustacean from the surface and the second concerns the state of the surface once the crustacean has been removed; specifically, crustaceans attach themselves to surfaces by means of a "glue" produced by the organism, and, after its detachment, there may remain on the area of contact of the crustacean an area that is "still contaminated" with the residues of this glue or with part of the crustacean itself.

Coatings that allow the crustacean to be detached easily from its surface with a minimum of organic residues after detachment of the organism are considered as having good marine fouling release properties. From the force which has to be applied to remove the crustacean from the surface of the coatings, an "improvement" of the barnacles release properties, normalised to unfilled PDMS (sample 1c), can be determined. For example, as the force applied to remove barnacles from the control sample 1c is 0.24 N·mm$^2$, and as the force to be applied to sample007 is 0.201 N·mm$^2$, thus the improvement observed for sample007 is of 0.039 N·mm$^2$, which represents 16.25% of the force corresponding to sample 1c. Normalised to sample 1c (sample 1c=100%), the improvement observed for sample007 is therefore 116.25%.

According to FIGS. 1 to 5, the barnacles-release performance of a PDMS-based polymer containing carbon nanotubes and/or sepiolite is improved.

Preferably, as shown in FIG. 1, the coating may comprise in weight 0.01% to 1% of carbon nanotubes, and more preferably between 0.05% and 1%. Indeed, the presence of carbon nanotubes in a PDMS-based coating improves the barnacles-release properties of the coating, (i.e. carbon nanotubes in a PDMS-based coating reduce the force required to detach barnacles), except for sample 005 (0.01% of carbon nanotubes) for which the improvement is not significant). Thus, for a PDMS-based coating comprising 0.05 to 1% of carbon nanotubes, the improvement observed goes from around 16% to around 38%.

Figure 2:
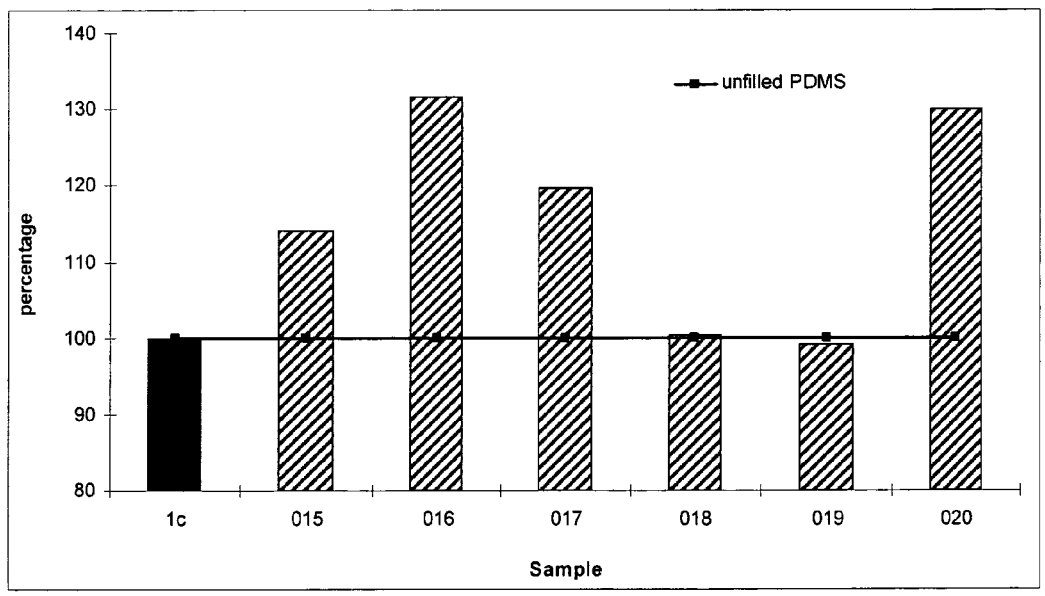
FIG. 2 represents the improvement of the crustaceans release of PDMS-based coatings comprising sepiolite.

Preferably, as shown in FIG. 2, the PDMS-based coating may comprise in weight 0.1 to 1% of sepiolite. Indeed, the presence of sepiolite in a PDMS-based coating also improves the barnacles-release properties of the coating. For a content of 0.1 to 1% of sepiolite, the improvement observed is around 14% to around 32%. For the samples comprising 3.5% (sample018) and 7% of sepiolite (sample0.19) there is no significant improvement compared to unfilled PDMS-based coating. The result observed for sample 20 (10% of sepiolite) may be due to an artefact in manipulation.

Figure 3:
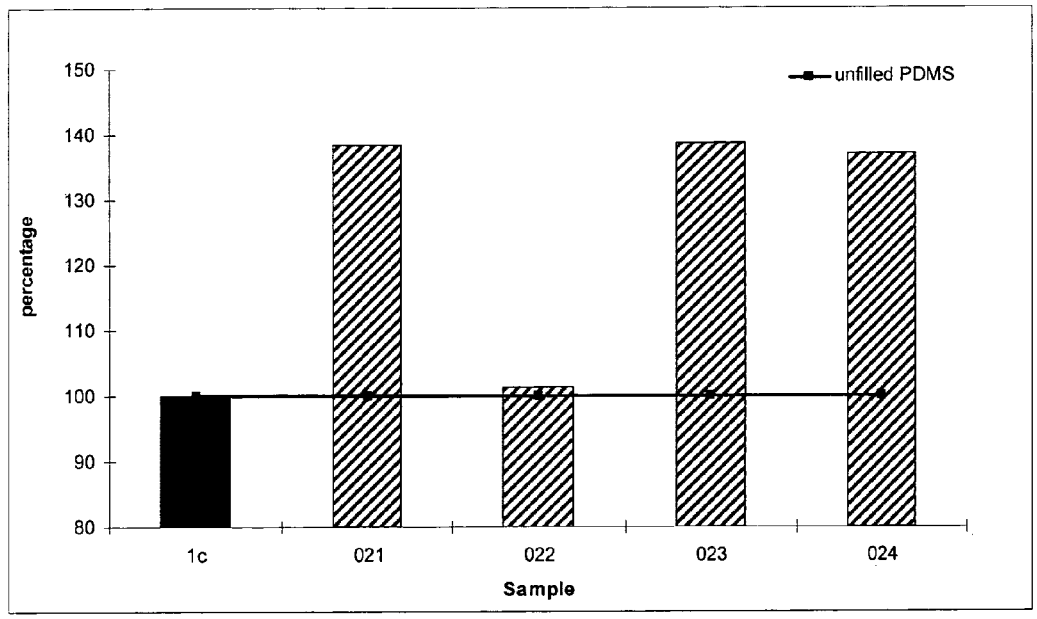
FIG. 3 represents the improvement of the crustaceans release of PDMS-based coatings comprising carbon nanotubes and sepiolite.

Preferably, the coating may comprise carbon nanotubes and sepiolite (FIG. 3). Preferably, the coating may comprise 0.05 to 0.1% in weight of carbon nanotubes and 1 to 3.5% in weight of sepiolite.

Figure 4:
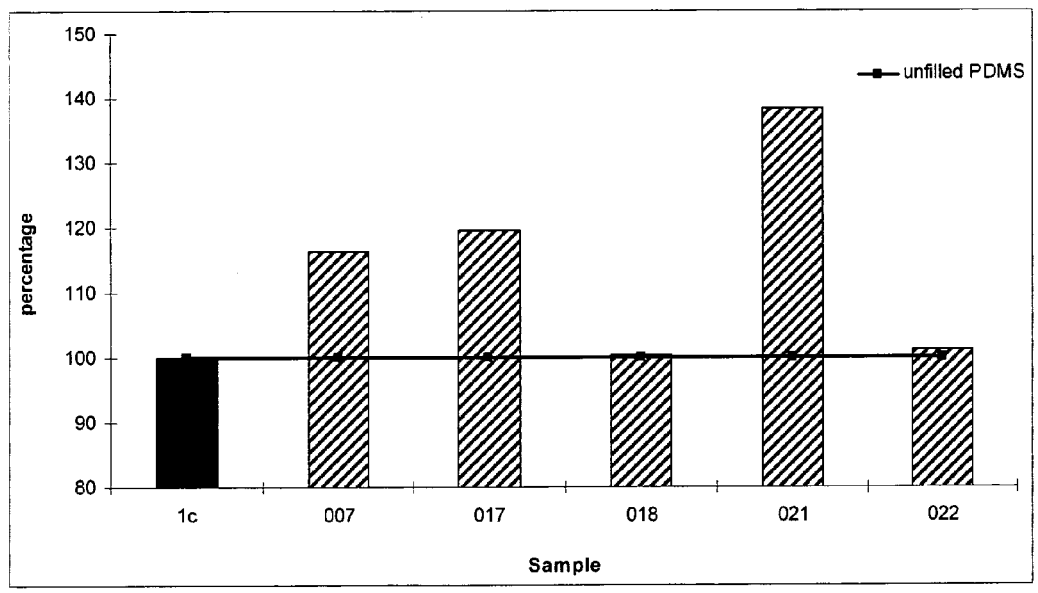
FIG. 4 represents the improvement of the crustaceans release of PDMS-based coatings comprising carbon nanotubes and sepiolite compared to PDMS-based coatings comprising carbon nanotubes or sepiolite.
Figure 5:
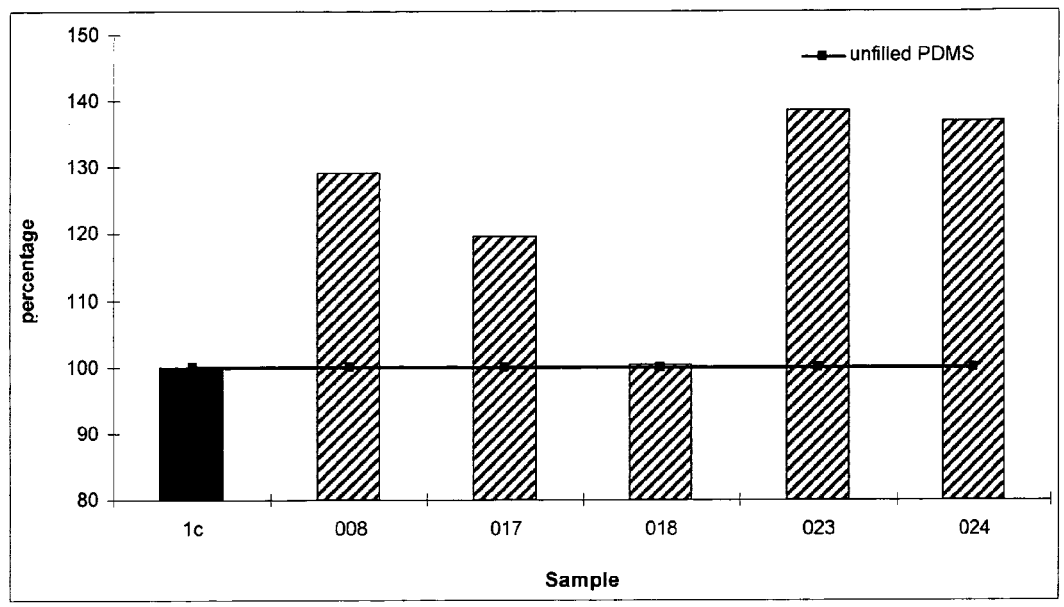
FIG. 5 represents the improvement of the crustaceans release of PDMS-based coatings comprising carbon nanotubes and sepiolite compared to PDMS-based coatings comprising carbon nanotubes or sepiolite.

In FIGS. 4 and 5, the barnacles-release improvement of samples 021 (0.05% CNT+1% Sepiolite), 022 (0.05% CNT+3.5% Sepiolite), 023 (0.1% CNT+1% Sepiolite) and 024 (0.1% CNT+3.5% Sepiolite) is compared to samples 007 (0.05% CNT), 008 (0.1% CNT), 017 (1% Sepiolite), 018 (3.5% Sepiolite). It appears that the improvement with mixed fillers may not be clearly attributed to carbon nanotubes or sepiolite.

Figure 6:
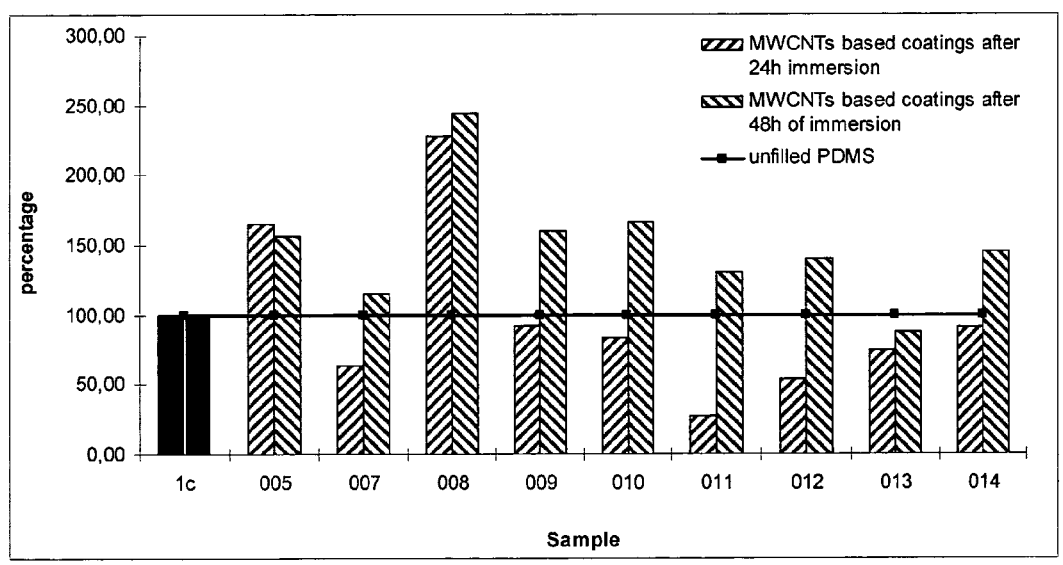
FIG. 6 represents the settlement of crustaceans on the surface of PDMS-based coatings free of fillers (sample 1c) or comprising carbon nanotubes, after 24 h or 48 h of immersion.
Figure 7:
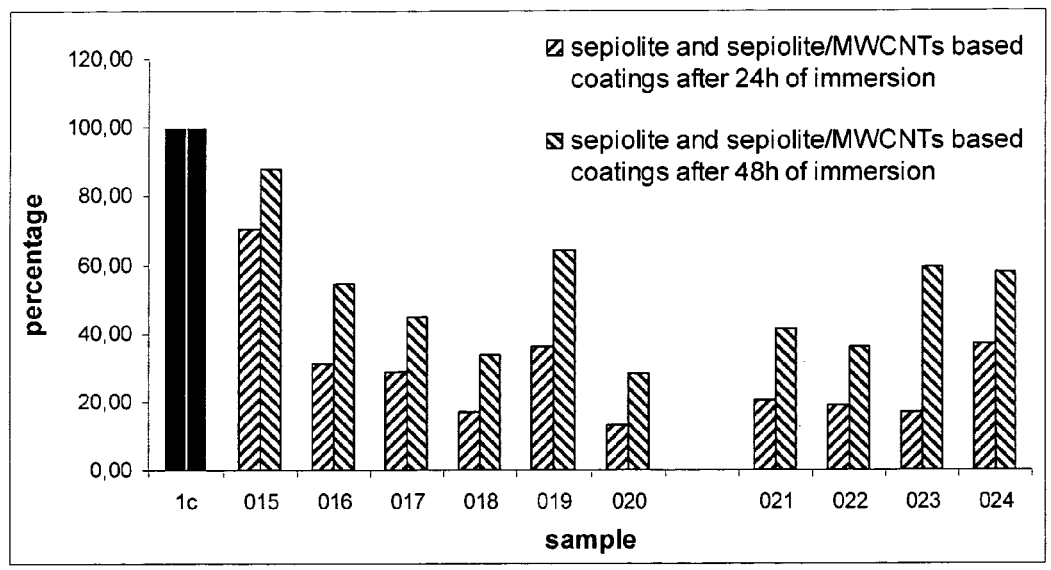
FIG. 7 represents the settlement of crustaceans on the surface of PDMS-based coatings free of fillers (sample 1c) or comprising sepiolite, or sepiolite and carbon nanotubes, after 24 h or 48 h of immersion.

Barnacles settlement studies (FIGS. 6 and 7) suggest that, compared to unfilled coating (sample 1c), the presence of carbon nanotubes (FIG. 6) do not prevent the settlement on such coatings after 48 h of immersion, and only a slight prevention can be observed after 24 h of immersion. Regarding coatings comprising sepiolite (FIG. 7), it can be noticed that such coatings have better anti-settlement activity compared to the unfilled PDMS-based coating. However, compared to a polystyrene or glass support (data not shown) PDMS-based coatings comprising sepiolite and/or carbon nanotubes clearly prevent the attachment of crustacean.

The coatings according the present invention have the advantage of being not environmentally toxic or hazardous. The percentage of cyprids mortality was determined (Table 3).

TABLE 3

Mean % mortality after 24 and 48 hours

| Sample | Mean % Mortality after 24 Hrs | 95% Confidence Interval after 24 Hrs | Mean % Mortality after 48 Hrs | 95% confidence Interval after 48 Hrs |
|---|---|---|---|---|
| 1c | 2.98 | 2.60 | 2.98 | 2.60 |
| 005 | 0.42 | 0.82 | 0.83 | 1.10 |
| 007 | 0.46 | 0.91 | 0.46 | 0.91 |
| 008 | 0.00 | 0.00 | 0.00 | 0.00 |
| 009 | 0.44 | 0.86 | 0.44 | 0.86 |
| 010 | 0.42 | 0.82 | 0.86 | 1.13 |
| 011 | 3.65 | 4.06 | 3.65 | 4.06 |
| 012 | 0.86 | 1.13 | 0.86 | 1.13 |
| 013 | 0.00 | 0.00 | 0.42 | 0.82 |
| 014 | 1.71 | 1.91 | 2.09 | 1.94 |
| 015 | 1.69 | 1.86 | 1.69 | 1.86 |
| 016 | 0.86 | 1.13 | 1.27 | 1.30 |
| 017 | 2.55 | 3.32 | 2.52 | 3.31 |
| 018 | 3.75 | 2.62 | 4.19 | 2.55 |
| 019 | 0.00 | 0.00 | 0.00 | 0.00 |
| 020 | 1.39 | 1.40 | 0.56 | 1.03 |
| 021 | 8.16 | 5.34 | 8.16 | 5.34 |
| 022 | 5.83 | 4.32 | 3.75 | 4.02 |
| 023 | 6.71 | 6.07 | 6.71 | 6.07 |
| 024 | 6.27 | 5.92 | 6.27 | 5.92 |

Low level mortality was noted (Table 3), which is consistent with the background (i.e. that of the internal lab controls) levels of mortality. There were also some instances of a number of cyprids drying out on the edge of the samples. This explains the higher levels of mortality on sample 017, 018 and 021 to 024 (rather than any toxic effect). However, no abnormal behaviour was noted.

Figure 8:
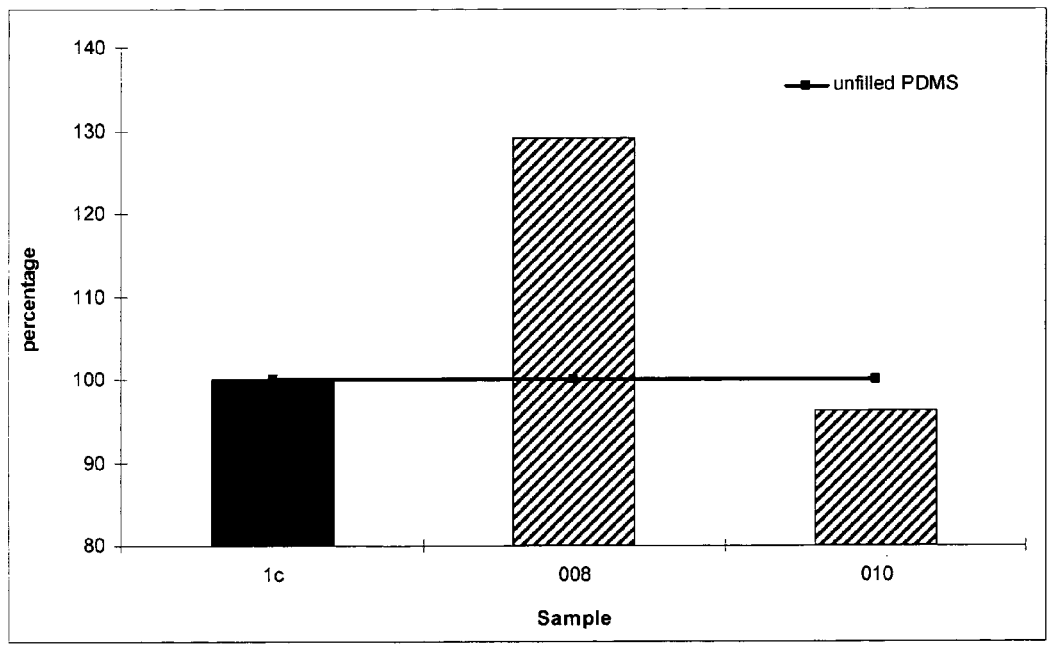
FIG. 8 represents a comparison of improvement of the crustaceans release of PDMS-based coatings comprising carbon nanotubes according to two methods to disperse carbon nanotubes in the PDMS-based matrix (Sample 008: obtained with the use of a premix, sample 010: obtained without the use of a premix).

The anti-fouling and/or fouling release coating may be processed by any suitable method. Preferably, according to FIG. 8, the anti-fouling and/or fouling release coating comprising carbon nanotubes may be processed by using a two step method which consists in forming a premix comprising carbon nanotubes, and then mix and/or dilute this premix with a helix blade to get the desired composition.

The assay procedure regarding the studies of cellular colonization is in accordance with section 4.2 of the Biological Workshop Manual (BWM, AMBIO Biological evaluation workshop, University of Birmingham UK 21-22 Apr. 2005; *Ulva* Sporeling Growth). Spores are released from plants collected from the seashore. The concentration of spores is adjusted to a standard concentration, for example $1 \times 10^6$ spores/ml. Each coating samples (table 2) are immerse in 30 liters of distilled water for one week, and then in artificial seawater for 1 hour, in darkness, in the presence of the colonizing cells (spores of the marine alga *Ulva*) before the growth medium added. The samples are then incubated in an illuminated incubator for days, the medium being refreshed every 2 days. The biomass on each slide is quantified by measurement of the amount of chlorophyll present. This is quantified directly through in situ fluorescence using for example a plate reader.

After 6 days growth, the amount of cells (or biomass) that becomes attached to the surfaces is evaluated by in situ fluorescence determination (section 4.2.1 of the Biological Workshop Manual, AMBIO Biological evaluation workshop, University of Birmingham, UK, 21-22 Apr. 2005) by virtue of the autofluorescence of the photosynthetic pigment chlorophyll by mean of a fluorescent reader which emits light of wavelength 430 nm, exciting the chlorophyll contained within the chloroplasts of the algal cells growing on the sample surface and then measures the 630 nm light, which is emitted as the pigment returns to 'resting state'. This method of biomass quantification has the advantage of being relatively quick and non-destructive.

The strength of sporeling attachment was determined by exposure to a 41.7 Pa shear stress in a water-channel apparatus (section 4.3.1 of the Biological Workshop Manual; AMBIO Biological evaluation workshop, University of Birmingham, UK, 21-22 Apr. 2005). The water-channel apparatus allows accurate wall shear stress determination from measurements of flow rate. The flow channel can hold for example 6 samples (microscope slides with or without coatings). A variable height bedding system allows each sample to be adjusted so that the surface is flush with the surrounding channel wall. Turbulent flow is created in a 60 cm long low aspect ratio section of channel preceding the sample. For example, flows of sea water (Instant Ocean) up to 4.9 m·s$^{-1}$ generate wall shear stresses up to 56 Pa. Exposure of samples to flow can be standardized for example at 5 min. Wall shear stresses can be determined for example from streamwise pressure drop measurements using the Reynolds-averaged Navier-Stokes equation.

Figure 9:
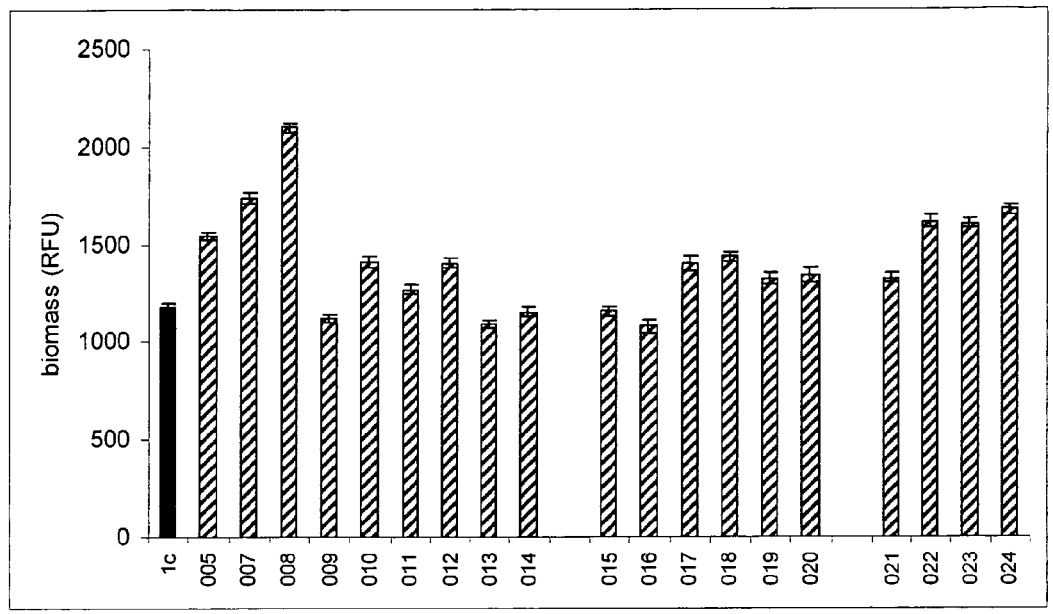
FIG. 9 represents the amount of spores (or biomass) of the marine alga *Ulva* that have colonized PDMS-based coatings comprising carbon nanotubes and/or sepiolite compared to the unfilled blank (sample 1c). N=1350, errors bars: ±2× standard Error.

As shown in FIG. 9, there is no significant difference between the amount of spores that have colonized the different PDMS-based coatings. None of the coatings tested appears to be less hospitable to the spores of the marine alga *Ulva*. Regarding the sample 008 for which *Ulva* biomass is notably higher then the control (1c), this observation may reflect differences in the initial settlement density of the *Ulva* spores.

In order to evaluate the adhesion of the spores to the different surfaces, the PDMS-based coatings are exposed to a flow of seawater, of a force of 41.7 Pa, in order to remove a maximum of spores. The number of cells remaining on the surface of the coatings is then counted and the percentage of detached cells is determined (FIGS. 10 to 15).

It appears that the presence of carbon nanotubes (FIG. 10) or sepiolite (FIG. 11) enables the PDMS-based coating to increase the percentage of cells detached from the surface of the coating. In other words, on a PDMS-based coating comprising cylindrical nanofillers, the spores of the marine alga *Ulva* adhere less strongly than on a filler-free PDMS coating. The foul-release performance of the polymer is thus improved.

Figure 10:
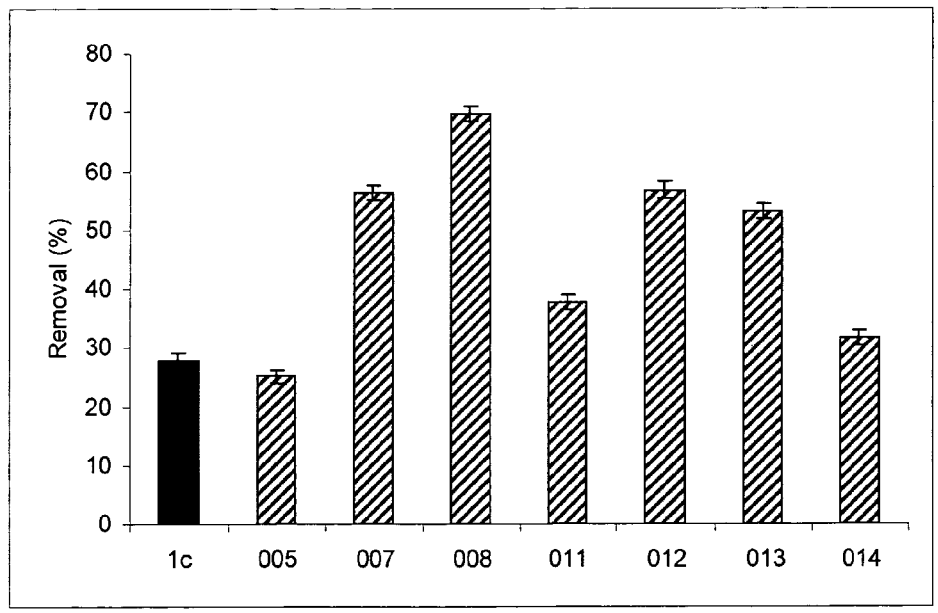
FIG. 10 represents the removal of *Ulva* sporeling biomass from PDMS-based coating comprising different loadings of carbon nanotubes, compared to the removal from the unfilled blank (sample 1c) after applying a flow force of 41.7 Pa of seawater to the surface. N=540, error bars=±2× Standard Error.

Preferably, as shown in FIG. 10, the coating may comprise in weight 0.01 to 2.5% of carbon nanotubes, more preferably 0.05 to 0.5%, and even more preferably 0.1% in weight of carbon nanotubes.

Figure 11:
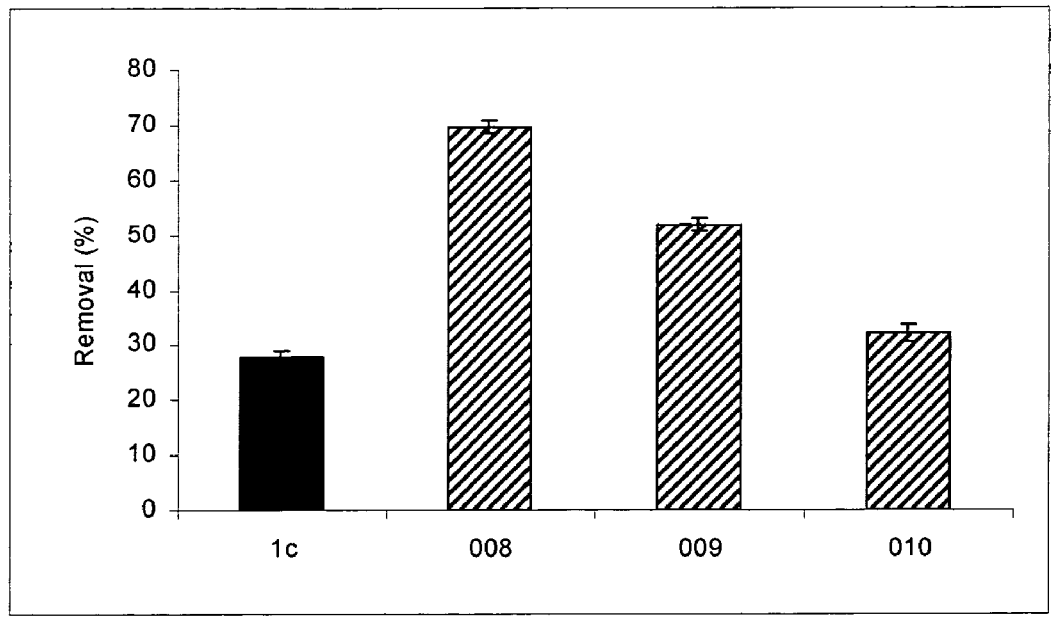
FIG. 11 represents the removal of *Ulva* sporeling biomass from PDMS-based coatings comprising 0.1% carbon nanotubes (prepared using different processes and with different batches of carbon nanotubes), compared to removal from the unfilled blank (sample 1c). N=540, error bars=±2× Standard Error.

Preferably, as shown in FIG. 11, the coating is processed by using a premix which is then mixed and/or diluted by using an helix blade.

Figure 12:
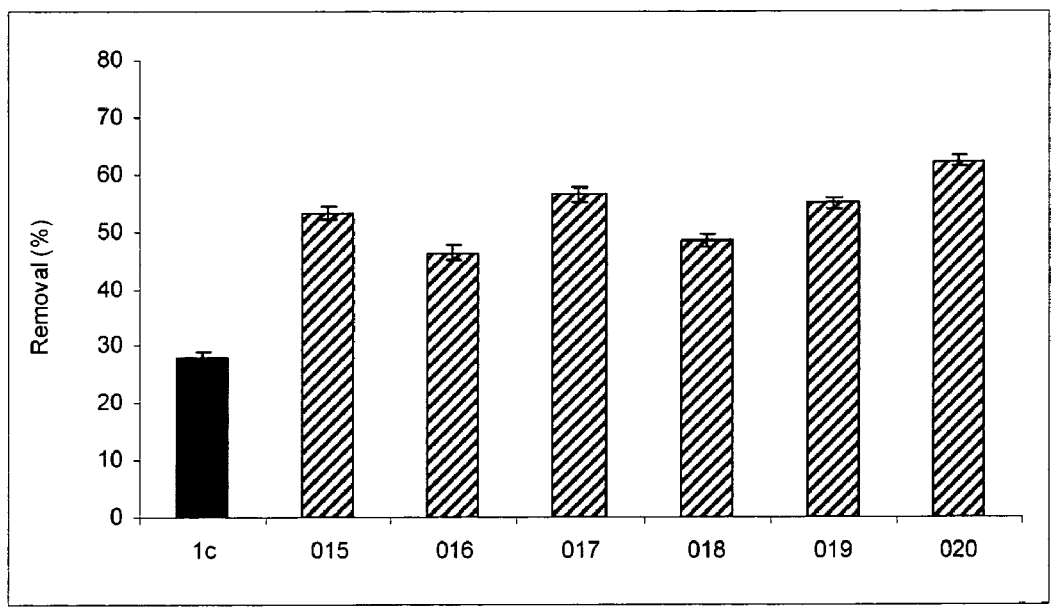
FIG. 12 represents the removal of *Ulva* sporeling biomass from PDMS-based coatings comprising different loadings of sepiolite compared to removal from the unfilled blank (sample 1c). N=540, error bars=±2× Standard Error.

Preferably, as shown in FIG. 12, the PDMS-based coating may comprise in weight 0.1% to 10% of sepiolite.

Figure 13:
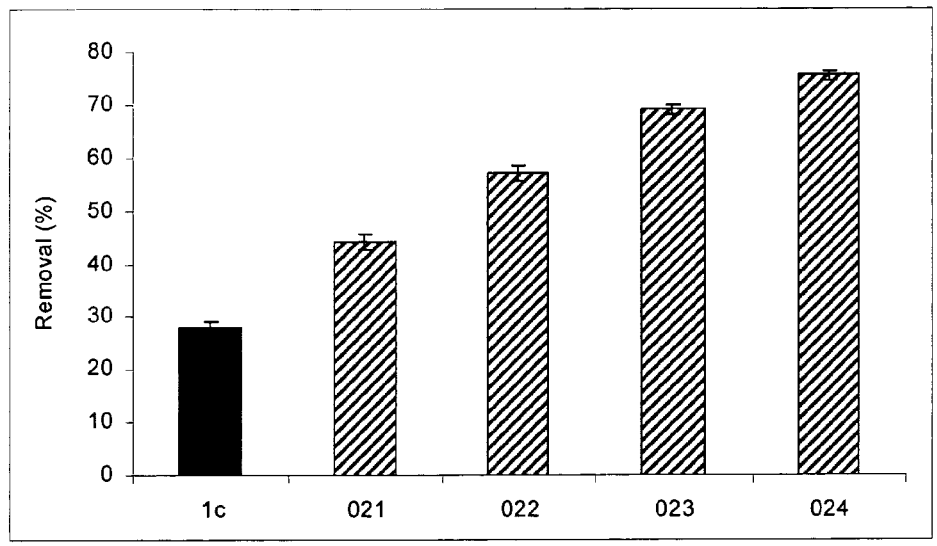
FIG. 13 represents the removal of *Ulva* sporeling biomass from PDMS-based coatings comprising two loadings of sepiolite (1% [sample-021, sample-023] or 3.5% [sample-022, sample-024]) and carbon nanotubes (0.05% [sample-021, sample-022] or 0.1% [sample-023, sample-024]) compared to removal from the unfilled blank (sample 1c). N=540, error bars=±2× Standard Error.

Preferably, the coating may comprise carbon nanotubes and sepiolite (FIG. 13). Preferably, the coating may comprise 0.05 to 0.1% in weight of carbon nanotubes and 1 to 3.5% in weight of sepiolite.

Figure 14:
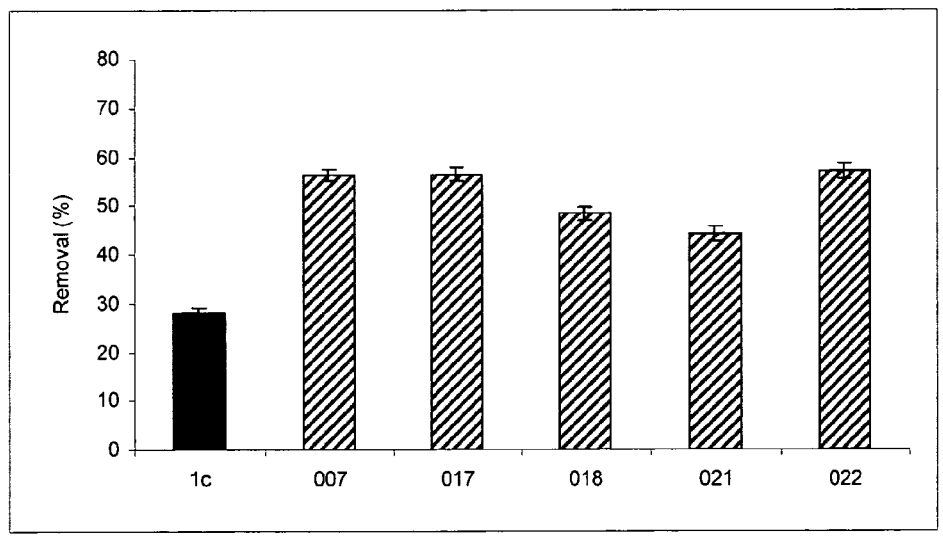
FIG. 14 represents a comparison of *Ulva* sporeling removal from mixed carbon nanotubes/Sepiolite PDMS-based coatings (as detailed in FIG. 13) with removal from coatings with the fillers present individually at the same loadings. Sample 007=0.05% CNT, Sample 017=1% Sepiolite, Sample 018=3.5% Sepiolite. N=540, error bars=±2× Standard Error.
Figure 15:
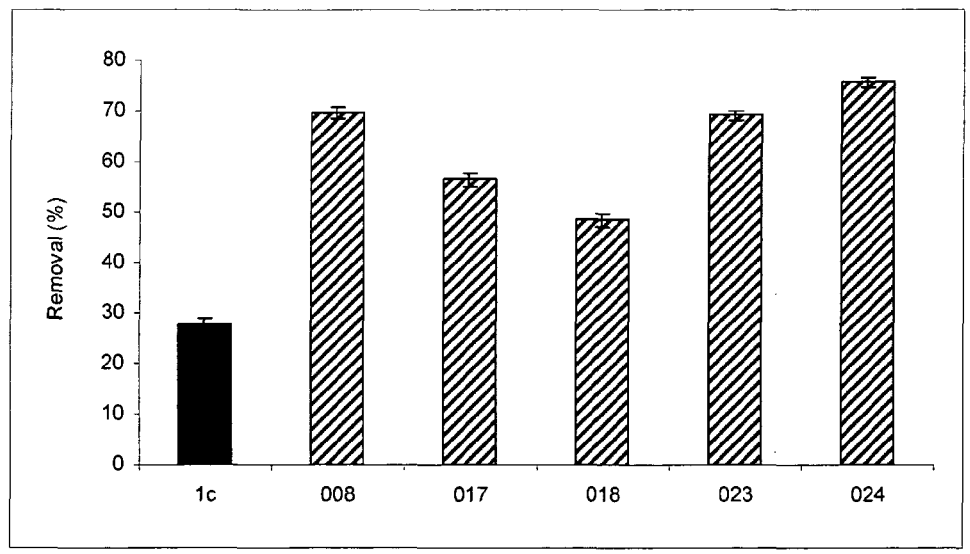
FIG. 15 represents a comparison of *Ulva* sporeling removal from mixed carbon nanotubes/Sepiolite PDMS-based coatings (as detailed in FIG. 13) with removal from coatings with the fillers present individually at the same loadings. Sample 008=0.1% CNT, Sample 017=1% Sepiolite, Sample 018=3.5% Sepiolite.

In FIG. 14, the *Ulva* sporeling removal of samples 007 (0.05% CNT), 017 (1% Sepiolite) and 018 (3.5% Sepiolite) is compared to samples 021 (0.05% CNT+1% Sepiolite) and 022 (0.05% CNT+3.5% Sepiolite). It appears that, the *Ulva* sporeling removal from coatings comprising mixed fillers (at 0.05% of carbon nanotubes) may largely be attributable to carbon nanotubes. However, the comparison (FIG. 15) of the *Ulva* sporeling removal of samples 008 (0.1% CNT), 017 (1% Sepiolite), 018 (3.5% Sepiolite) with samples 023 (0.1% CNT+1% Sepiolite) and 024 (0.1% CNT+3.5% Sepiolite) show that, at 0.1% of carbon nanotubes, the mixed fillers present an increased *Ulva* sporeling removal, suggesting a synergic effect between carbon nanotubes and sepiolite.

The effect of carbon nanotubes on the viscosity of a PDMS-based composition, in particular the viscosimetric properties of the precursor A, makes it possible to envisage application of this precursor by brush or a paint roller for particular embodiments of the invention in which the cylindrical nanofiller of the composition comprises at least carbon nanotubes, i.e. a composition in which the cylindrical nanofiller comprises carbon nanotubes and one or more other cylindrical nanofillers that are not carbon nanotubes, or a composition in which the cylindrical nanofiller consists of carbon nanotubes.

Figure 16:
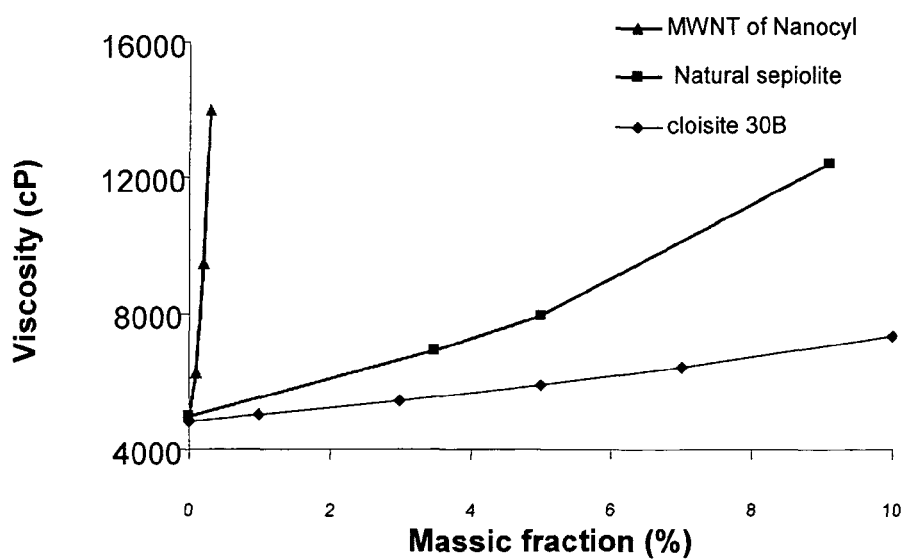
FIG. 16 represents the variation in viscosity of the polymer precursor as a function of the amount of filler for composites comprising carbon nanotubes, sepiolite or Cloisite 30B.

The effect of the carbon nanotubes on the viscosity of the constituents of the polymer into which they are incorporated, especially of the precursor A, is illustrated in FIG. 16. The viscosity of the precursor A containing multi-walled carbon nanotubes is markedly increased compared with more standard compositions containing clay-based fillers.

Figure 17:
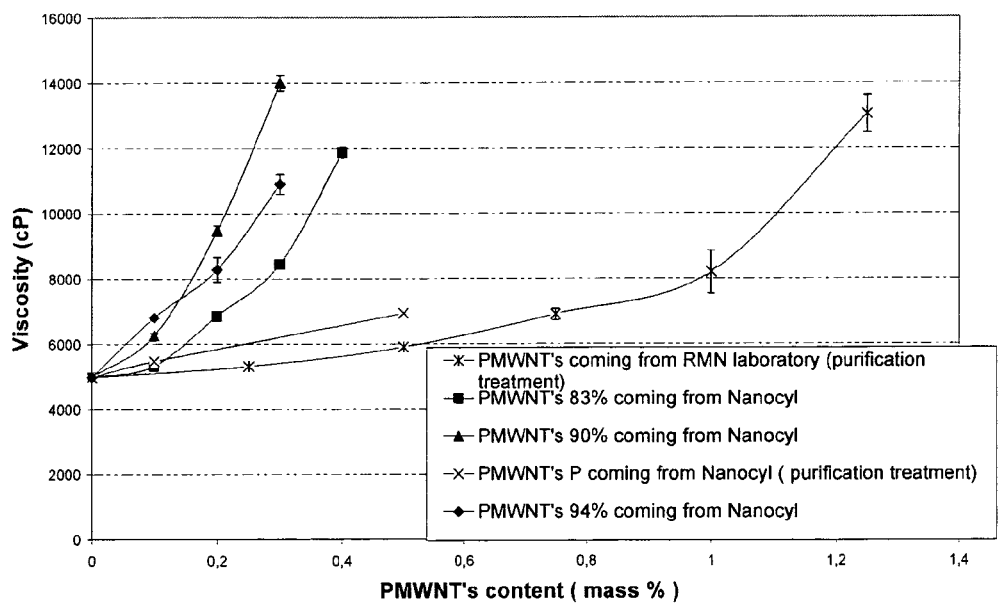
FIG. 17 represents the variation in viscosity of the polymer precursor as a function of the amount of filler for compositions comprising carbon nanotubes of different nature.

As shown in FIG. 17, the viscosity of the precursor A varies as a function of different parameters such as the size, the diameter and the purity of the carbon nanotubes.

It appears that a filler content of less than 1% by weight of carbon nanotubes allows a significant increase in viscosity and more particularly with carbon nanotubes that have undergone no post-synthetic treatment. These nanotubes lead to a significant increase in the viscosity of the polymer with very low filler contents of between 0.2% and 0.3% by weight. This surprising increase in viscosity is explained by the very high affinity of the raw carbon nanotubes for the polysiloxane polymer, as shown by the measurements taken by means of a "bound rubber" test (Table 4). The experimental procedure of this test consists in extracting 3.5 g of precursor A/carbon nanotubes mixture with 30 mL of solvent (heptane) for 4 hours, at 25° C. After centrifuging and evaporating off the solvent, the dry residue is weighed in order to determine the amount of PDMS polymer bound to the carbon nanotubes. Table 3 shows that the cylindrical nanofillers, carbone nanotubes or sepiolite, have higher affinity for the precursor A compared to a platelet-type filler such as Cloisite 30B.

TABLE 4

Affinity of carbon nanotubes for the polymer matrix of the composition

| Composition | Amount (in grams) of PDMS bound per gram of fillers | Comments |
| --- | --- | --- |
| 0.5% by weight of carbon nanotubes (MWNTs) | 60 | Excellent affinity |
| 0.1% by weight of carbon nanotubes (MWNTs) | 107 | |
| 5% by weight of sepiolite | 1.2 | Good affinity |
| 0.5% by weight of sepiolite | 2.5 | |
| 0.5% by weight of cloisite 30B | ~0.1 | No affinity |

Thus, the viscosimetric properties of the precursor A containing a small amount of carbon nanotubes allow it to be applied by brush, a paint roller, spraying, or a manual plate coater, in order to coat the surface of a material. However, the application of the composition according to the invention to a support or a surface may be performed via any suitable means. For example, the application may be performed by injection moulding or by casting.

The invention claimed is:

1. Method for the protection of a support against soiling of marine origin, said method comprising the step of applying a marine anti-biofouling and/or fouling release coating composition on said support, said composition comprising a polysiloxane-based polymer and at least one cylindrical nanofiller in order to create a surface that is non-stick for marine organisms.

2. Method according to claim 1, wherein the cylindrical nanofiller represents in weight between 0.01% and 10% of the total weight of said composition.

3. Method according to claim 2, wherein the cylindrical nanofiller represents in weight between 0.01% and 3.5% of the total weight of said composition.

4. Method according to claim 1, wherein the cylindrical nanofiller comprises carbon nanotubes.

5. Method according to claim 4, wherein the carbon nanotubes represent in weight between 0.01% and 2.5% of the total weight of said composition.

6. Method according to claim 5, wherein the carbon nanotubes represent in weight between 0.01% and 1% of the total weight of said composition.

7. Method according to claim 6, wherein the carbon nanotubes represent in weight between 0.05% and 1% of the total weight of said composition.

8. Method according to claim 7, wherein the carbon nanotubes represent in weight between 0.05% and 0.5% of the total weight of said composition.

9. Method according to claim 8, wherein the carbon nanotubes represent in weight 0.1% of the total weight of said composition.

10. Method according to claim 4, wherein the carbon nanotubes are chosen from the group of single-walled carbon nanotubes (SWNTs), double-walled carbon nanotubes (DWNTs) and multi-walled carbon nanotubes (MWNTs).

11. Method according to claim 1, wherein the cylindrical nanofiller comprises sepiolite.

12. Method according to claim 11, wherein the sepiolite represents in weight between 0.1% and 10% of the total weight of said composition.

13. Method according to claim 12, wherein the sepiolite represents in weight between 0.1% and 3.5% of the total weight of said composition.

14. Method according to claim 13, wherein the sepiolite represents in weight between 0.1% and 1% of the total weight of said composition.

15. Method according to claim 1, wherein said composition comprises sepiolite and carbon nanotubes.

16. Method according to claim 15, wherein the carbon nanotubes represent in weight between 0.05% and 0.1% of the total weight of said composition and sepiolite represents in weight between 1% and 3.5% of the total weight of said composition.

* * * * *